US005567056A

United States Patent [19]
Blase et al.

[11] Patent Number: 5,567,056
[45] Date of Patent: Oct. 22, 1996

[54] TURBOCHARGER DRIVE AND PLANET BEARING THEREFOR

[75] Inventors: James L. Blase, Lemont; Charles H. McCreary, Oak Park, both of Ill.

[73] Assignee: General Motors Corporation, Detroit, Mich.

[21] Appl. No.: 315,205

[22] Filed: Sep. 29, 1994

[51] Int. Cl.$^6$ ..................................................... F16C 33/10
[52] U.S. Cl. ........................... 384/286; 384/380; 384/115
[58] Field of Search ............................ 384/286, 289–291, 384/313, 322, 372, 373, 380, 114, 115, 118, 120

[56] References Cited

U.S. PATENT DOCUMENTS

| | | | |
|---|---|---|---|
| 1,495,660 | 5/1924 | Ziegler | 384/286 |
| 3,110,528 | 11/1963 | Parker | 384/291 |
| 3,287,072 | 11/1966 | Buske | 384/286 |
| 4,700,583 | 10/1987 | Hicks | 74/410 |
| 4,719,818 | 1/1988 | McCreary | 7/750 R |
| 4,834,559 | 5/1989 | Kalvoda | 384/118 |
| 5,169,242 | 12/1992 | Blase et al. | 384/114 X |

FOREIGN PATENT DOCUMENTS

0130971A1  7/1984  European Pat. Off. .
0202173A1  11/1986  European Pat. Off. .
0612883  11/1948  United Kingdom .

*Primary Examiner*—Thomas R. Hannon
*Attorney, Agent, or Firm*—Charles K. Veenstra

[57] ABSTRACT

A planet bearing and gear assembly for the carrier of a speed increasing planetary gear train for driving a diesel engine turbocharger or the like includes an enlarged diameter gear bore and associated bearing outer diameter for lightening the gear and increasing the bearing area to at least 50 percent and preferably more than 65 percent greater than those of the bearing inner wall and the outer diameter of an associated support pin. Self-cleaning of unfiltered dirt particles in the engine lubricating oil is provided by dirt expulsion passages formed by flats at the edges of an oil supply groove in the planet bearing while operation with entrained dirt particles capable of passing through the engine lubricating oil filters is improved by increased oil film thickness resulting from reduced bearing loads due to reduction of mass of the planet gears and increased bearing surface. Circumferential oil grooves in the inner surface help cool the bearing prior to delivery to an oil supply groove which is configured with a flat floor toward one end adjacent oil supply holes and an arcuate floor on the other end to improve manufacturing accuracy and convenience.

7 Claims, 3 Drawing Sheets

5,567,056

TURBOCHARGER DRIVE AND PLANET BEARING THEREFOR

TECHNICAL FIELD

This invention relates to turbochargers for engines, especially of the two cycle diesel type, wherein a speed increasing planetary gear drive train is provided. More particularly the invention relates to a turbocharger drive with an improved planet bearing for a planet gear in a rotatable planet carrier of a turbo gear drive train.

BACKGROUND

It is known in the art relating to engines, such as two cycle diesel engines, to provide an exhaust driven turbocharger (turbo) for supplying scavenging and charging air to the cylinders at above ambient pressures during operation at higher loads and speeds. A gear train may also be provided to drive the turbocharger at lower speeds or loads during which the engine exhaust energy is insufficient to maintain a turbo rotational speed adequate to deliver the required air supply. U.S. Pat. No. 4,719,818 McCreary discloses in FIG. 1–3 a planet gear drive arrangement in which an enlarged hub rotatably supports a bearing in a planet gear. The mechanism increases the bearing area and reduces the mass of the planet gear as compared to the prior art commercial arrangement shown in FIGS. 4 and 5 where a bearing is mounted on a support pin and rotatably carries a non-sleeved planetary gear. The prior art arrangement illustrated represents a turbocharger drive arrangement which has been used extensively in diesel-electric railway locomotive engines produced by the Electro-Motive Division of General Motors as well in numerous other applications of such engines.

SUMMARY OF THE INVENTION

The present invention provides an improved planet bearing and a bearing and gear assembly for a turbocharger planetary drive train of the type previously referred to. A bearing according to the invention is formed with an enlarged outer diameter that is received within a correspondingly enlarged bore of the associated planet gear to provide increased oil film thickness due to reduced bearing loads and increased load area in a manner similar to the arrangement of U.S. Pat. No. 4,719,818 but without resorting to the separate hub arrangement illustrated in the Patent. In addition the planet bearing includes flats on shoulders bordering an oil supply groove wherein the flats provide passages for self-cleansing of the bearing from larger particle dirt contamination. Another feature is that circumferential grooves provided on the interior of the enlarged bearing conduct lubricating oil to the oil supply groove and additionally assist in cooling the bearing.

The improved bearing and gear assembly thus provides an increased minimum film thickness over the bearing surface which allows satisfactory bearing operation with smaller particle dirt contamination at a level permitted by the engine lubricating oil filtration system. The self-cleansing action of the bearing eliminates dirt particles that are larger than the minimum bearing film thickness, thus reducing damage from unfiltered contaminants in the lubricating oil. In addition, the increased oil flow through the bearing and the cooling effect of the internal grooves provides a reduction, or no significant increase, in the bearing temperature rise across the oil film in spite of higher friction losses due to increased oil shearing rates at the enlarged bearing diameter.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
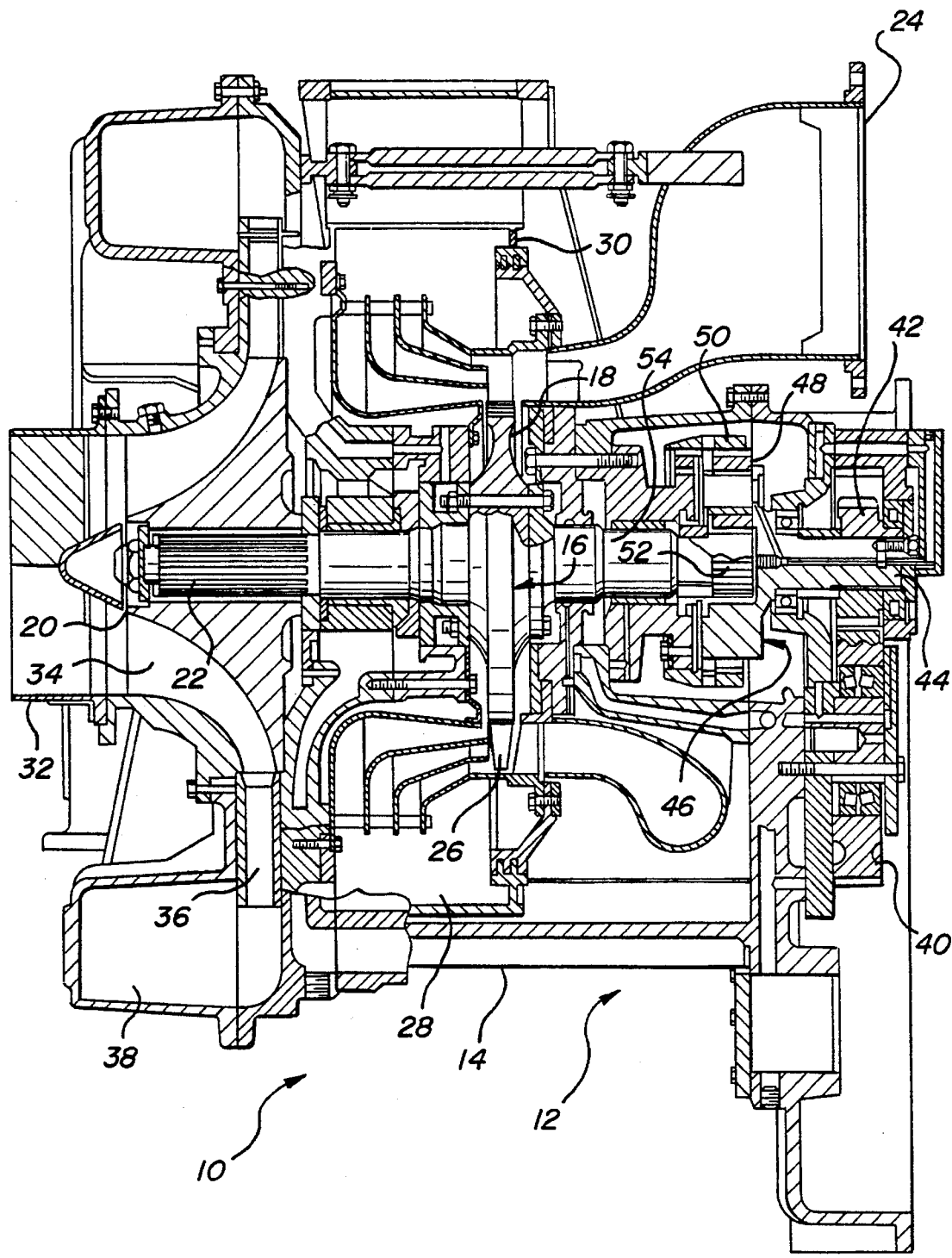
FIG. 1 is a fragmentary cross-sectional view of the rear end of a medium speed turbocharged two cycle diesel engine showing the turbocharger and drive train with an improved planet bearing and gear assembly in accordance with the invention.

Referring now to the drawings in detail, numeral 10 generally indicates a turbocharged two stroke cycle medium speed diesel engine, particularly of the railway diesel type previously referred to, and having an improved planet bearing and gear assembly according to the invention. Engine 10 includes a fabricated crankcase, not shown, at the rear of which there is mounted a gear and exhaust gas driven turbocharger generally indicated by numeral 12.

The turbocharger 12 includes a housing 14 supporting a rotor 16 that includes a turbine wheel 18 and a compressor wheel or impeller 20 mounted on a common shaft 22. The turbine wheel 18 is driven by exhaust gases discharged from the engine cylinders, not shown, and directed through an inlet duct and scroll 24 against blades 26 on the turbine wheel, where a portion of the exhaust energy is utilized for turning the rotor 16. The exhaust gases are then received in a collector chamber 28 and discharged through an exhaust duct 30.

Rotation of the rotor 16 turns the impeller 20, drawing ambient air through an inlet duct 32 to rotating blades 34 on the impeller where the air is compressed. The compressed inlet air is then discharged through a diffuser 36 to an outlet scroll 38 from which it is carried by duct means, not shown, to the engine cylinders.

The non-illustrated crankcase portion of the engine 10 is conventionally provided with a plurality of pistons reciprocable within associated cylinders and connected with the throws of a crankshaft. The latter is, in turn, connected through gears and an overrunning clutch, not shown, with an idler gear 40 mounted in the turbo housing 14.

The idler gear 40 drives a carrier drive gear 42 which is mounted on a shaft end 44 of a planet carrier 46. Three, planet gears 48 are rotatably mounted on the carrier in a manner to be subsequently described. These engage a ring gear 50 fixed to the turbo housing 14 and a sun gear 52 formed on one end of a drive shaft 54 attached to the turbocharger rotor 16. This gear train provides a large increase in rotational speed for driving the rotor 16 from the relatively slow speed engine crankshaft.

Figure 2:
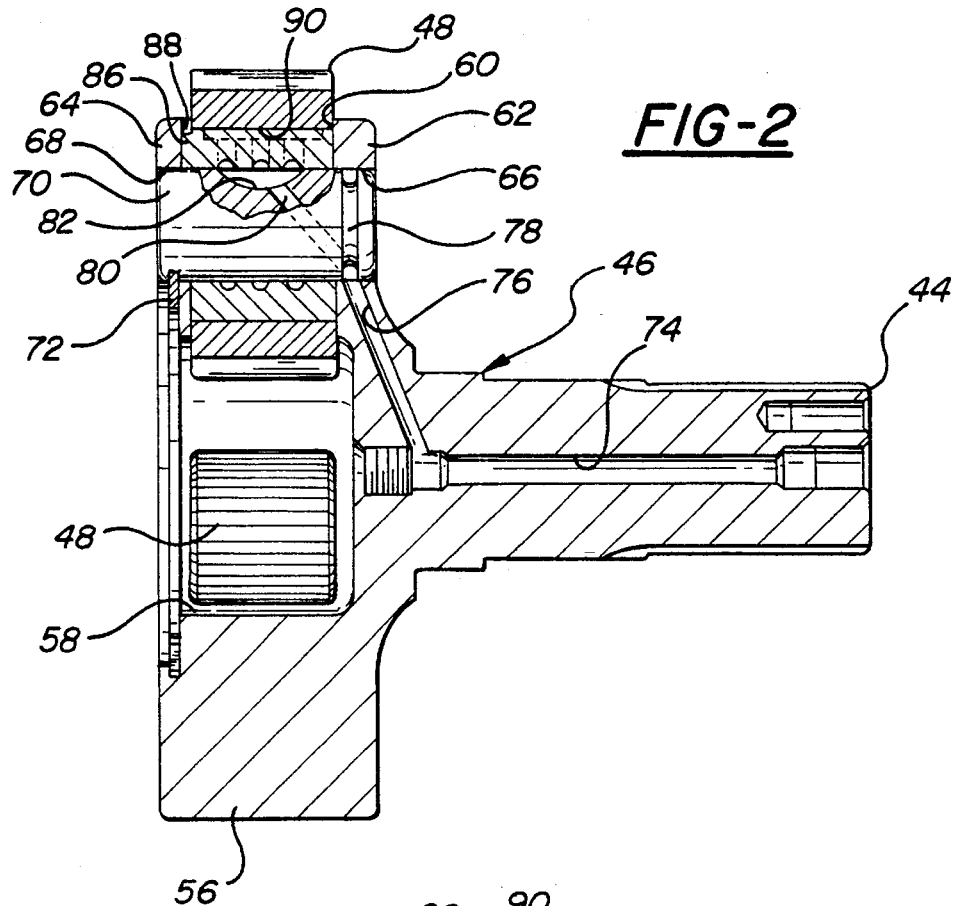
FIG. 2 is an enlarged axial cross-sectional view of the planet carrier in the turbocharger of FIG. 1 showing the improved planet bearing and gear assembly and its support arrangement.
Figure 3:
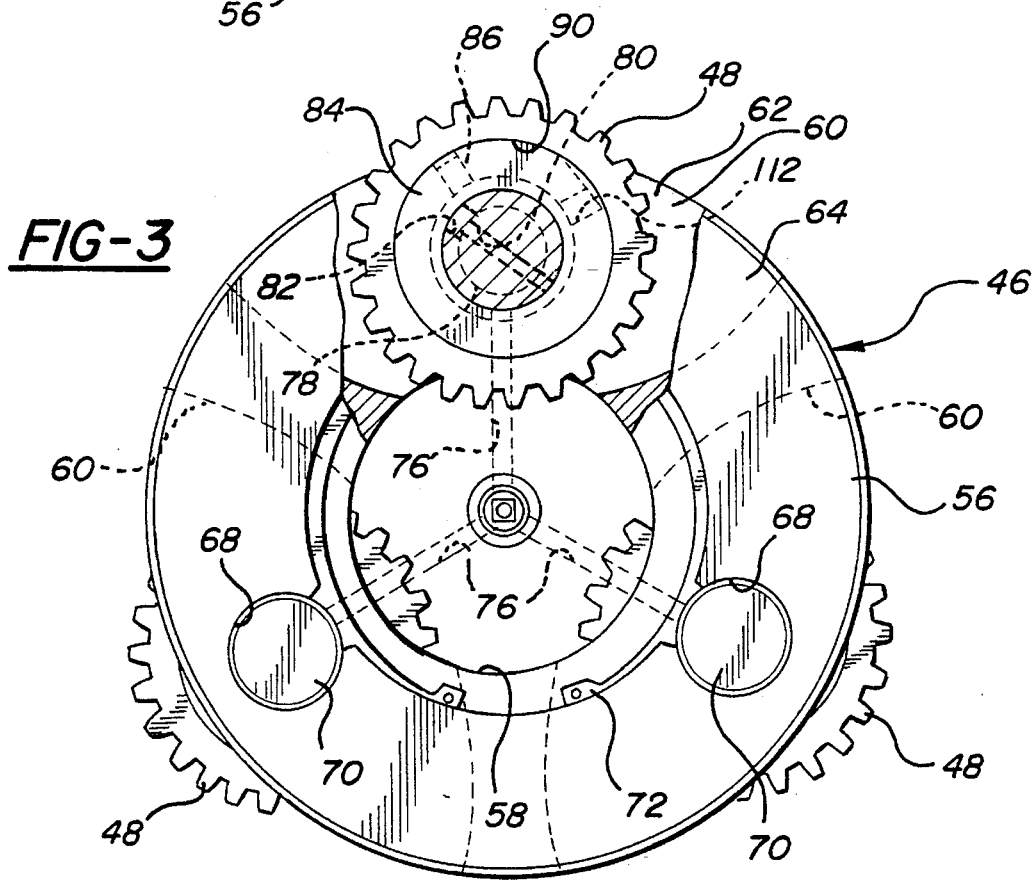
FIG. 3 is an end view of the planet carrier of FIG. 2 having a portion broken away to better show one of the planet gears.
Figure 4:
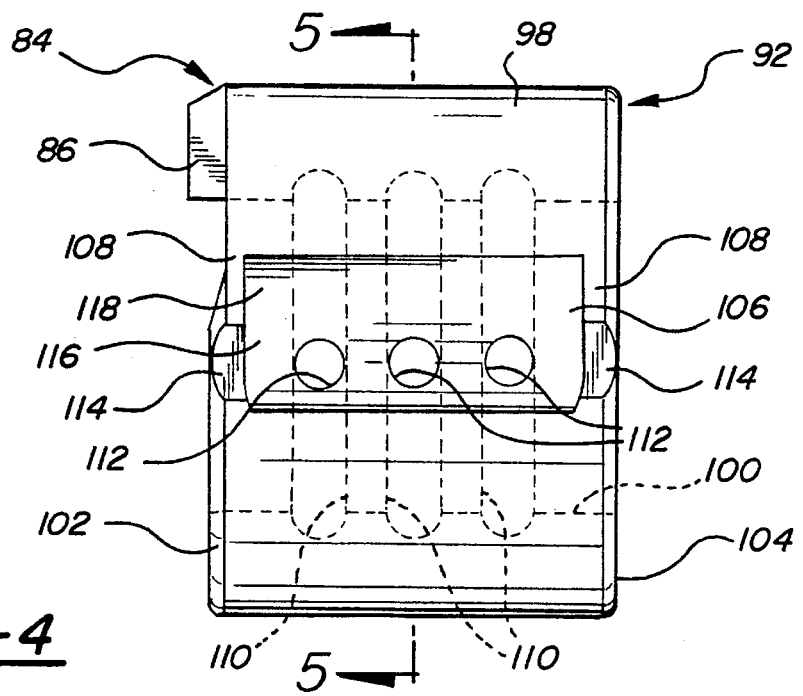
FIG. 4 is a side view of one of the planet bearings of FIGS. 1–3 showing details of its oil distribution system.
Figure 5:
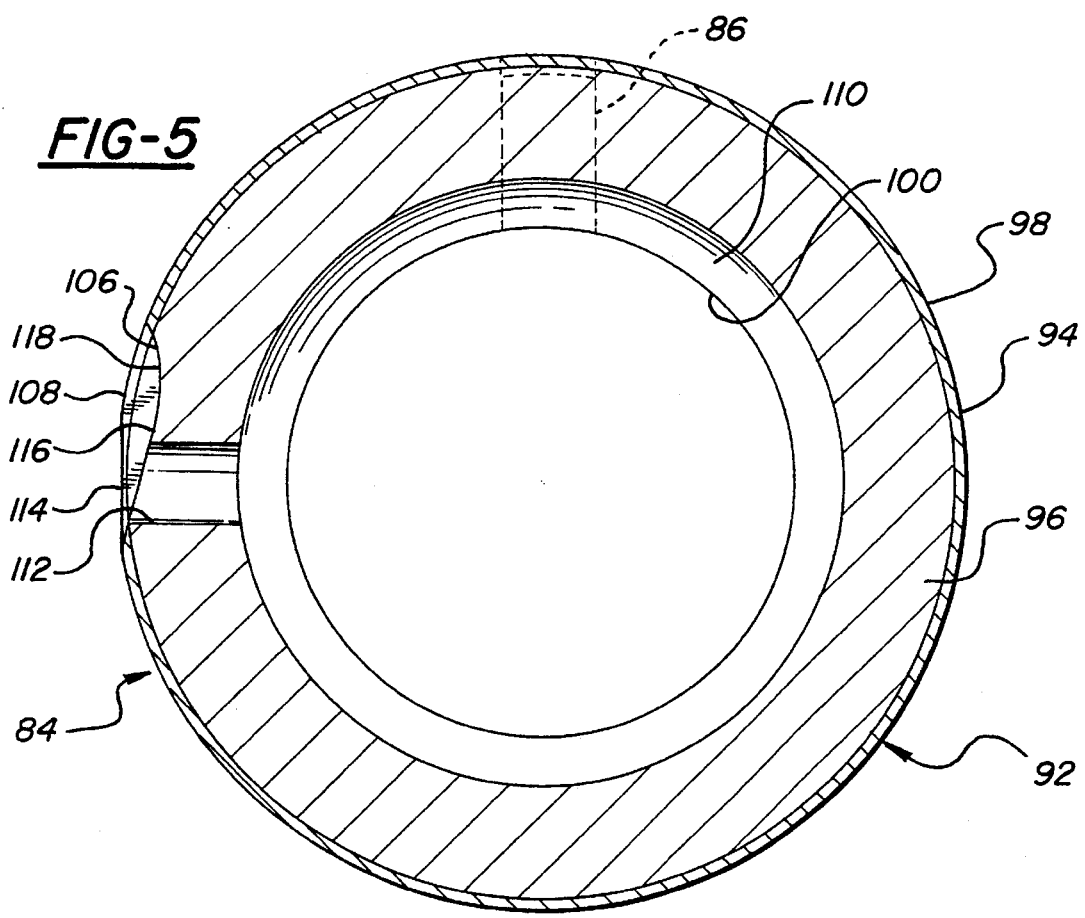
FIG. 5 is a transverse cross-sectional view along the line 5—5 of FIG. 4.

The planet carrier 46 and gears 48 are more clearly illustrated in FIGS. 2 and 3, which show the carrier 46 having an annular end 56 opposite the shaft end 44 (shown in FIG. 1). The annular end 56 includes a circular recess 58 open axially at the end for receiving the sun gear 52 in the assembly of FIG. 1. Three annularly spaced radially extending cutouts 60 are also provided for receiving the planet gears 48.

The cutouts 60 form axially spaced front walls 62 and rear walls 64 having longitudinally aligned front and rear openings 66, 68, respectively, in which axle shafts or pins 70 are received. A resilient retaining ring 72, received in aligned grooves in the carrier and pins, retains the pins in position in their openings 66, 68. The carrier 46 and pins 70 are substantially unchanged from the prior art arrangement illustrated in U.S. Pat. No. 4,719,818 and provide oil passages 74, 76 in the carrier, connecting through enclosed annular grooves 78 and passages 80 in the pins 70 with recesses 82 in outer surfaces of the pins.

In accordance with the invention, bearings 84 having enlarged outer diameters are press fitted on the pins and fixed in non-rotatable positions by appropriate means such as dowels or, as shown, lugs 86 received in grooves 88 in the rear walls 64 of the planet carrier. The planet gears 48 are rotatably mounted on the bearings 84 and are provided with enlarged bores 90 to mate with and form an assembly with the enlarged diameter bearings. In the illustrated embodiment, the gear bores 90 have inner diameters approximately 68 percent larger than the diameters of their associated supporting pins 70 so that the bearing engaging surfaces of the gears are substantially increased over those of the prior art embodiment.

Each of the associated planet bearings 84 is formed as an annular ring 92 having an outer lining of bearing material 94, which is preferably a dirt embedding leaded bronze such as AMS 4822 bronze, laid over a steel base 96. Preferably a thin nickel barrier, not shown, is provided between the outer lining and the steel base 96 and a thin overlay of suitable high embedability corrosion resistant material is provided over the bronze.

The bearing ring 92 has a cylindrical outer bearing surface 98 coaxial with a cylindrical inner wall 100 and first and second opposite ends 102, 104. An oil supply groove 106 is recessed below the bearing surface and bounded axially by shoulders 108 adjacent the ends. Oil supply means through the bearing for delivering oil to the supply groove 106 from the recess 82 of the associated pin 70 are provided by three axially spaced annular grooves 110 recessed into the inner wall 100 and connecting respectively with three supply holes 112 each extending from one of the annular grooves to axially spaced locations along the supply groove 106. Flats 114 are preferably provided along otherwise convex peripheries of the shoulders to increase local clearance to the associated planet gear. The flats 114 are located generally in axial alignment (i.e. lie in the same axial plane) with the supply holes 112 and define passages through which larger dirt particles in the oil may be expelled without damaging the bearing. While flats have proven effective and are easily formed, it would be possible to use other passage means such as grooves or holes and to locate them out of axial alignment with the supply holes 112.

For ease of manufacturing, the supply groove 106 is formed with a floor having a flat portion 116 at one end extending across the supply holes 112 and intersecting the outer surface 98 of the bearing near and spaced slightly in the direction of gear rotation from the supply holes. At the other end, the supply groove floor has an arcuate configuration or curved portion 118. The particular shape permits accurate positioning of the downstream intersection of the supply groove with the bearing outer surface and allows forming of the groove with a single pass of a milling cutter to the desired depth, so as to form the flat portion 116 of the groove by movement of the cuttler relative to the bearing and leaving the curved portion 118 of the groove at the end of the cut. The diameter of the bearing outer surface 98 is also made approximately 68 percent larger than that of the inner wall 100 since these parts are made for assembly respectively, with the bore of the associated gear and the outer diameter of the associated pin.

In operation of a turbocharger and planet carrier having improved bearings according to the invention, oil delivered through the passages in grooves 74, 76, 78, 80 to the recesses 82 of the pins flows circumferentially through internal annular grooves 110 and outward through supply holes 112 to the oil supply grooves 106 in the outer surfaces of the bearings 84 from which it is carried between the bearing and planet gear surfaces during the rotation of the planet gears 48. Oil flow through the annular grooves 110 as well as around the surface of the bearing aids in cooling of the bearing during operation.

The planet carrier 46 rotates whenever the turbo rotor 16 is in motion and causes the planet gears to orbit as well as rotate at relatively high rotation speeds. The masses of the planet gears thus develop significant centrifugal forces which act upon the bearing surfaces. Because of the high speeds involved, these centrifugal forces impose higher loads on the bearings than the forces required to drive the turbocharger in its highest speed at the unloaded engine condition where the gear drive forces are maximum. As compared to the prior art version of the planet gear and bearing arrangement, the centrifugal forces of the illustrated arrangement are much reduced because of the reduced masses of the planet gears with their larger bore diameters. In addition, the planet bearing diameters are larger and the load carrying surfaces are, therefore, of greater area. The reduced bearing loads result in a substantial increase in the minimum oil film thicknesses in the load carrying portions of the bearings which allows the planet bearings to accommodate operation with dirt particles that are small enough to pass through the engine oil filters without causing excessive wear and distress to the turbo planet bearings.

Unfiltered dirt particles which may be found in the oil engine system as manufactured, or may enter the system other than through the filter system, are cleaned from the system by passing through the dirt expulsion passages formed by the flats 114 located adjacent to supply holes in the shoulders 108. These flats form overflow bypass paths for the supplied oil which carries away particles as much as 10 times larger than the minimum film thickness in the bearing so that these unfiltered dirt particles do not cause bearing distress but are recirculated to the filter system for removal from the oil flow. If some dirt particles larger than the minimum clearance do enter the bearing clearances, the leaded bronze bearing material allows them to be embedded in the surface and trapped so they do not scratch or groove other portions of the bearing surface.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A planet bearing for rotatably supporting a planet gear in an engine turbocharger drive, said bearing including an annular ring having an outer bearing surface coaxial with a cylindrical inner wall and opposite first and second ends, an oil supply groove recessed below the bearing surface and bounded axially by shoulders adjacent the ends, oil supply means through the bearing from the inner wall to the supply groove, and the improvement comprising:

passage means in at least one of said shoulders connecting said oil supply groove with an adjacent one of said ends and defining a path for expulsion of dirt-carrying oil from the bearing lubrication oil supply, wherein said passage means are provided in both of said shoulders, and wherein said passage means comprise flats formed along otherwise convex peripheries of said shoulders to effectively increase local clearance between the shoulders and an associated planet gear.

2. A bearing as in claim 1 wherein said oil supply means comprise supply holes.

3. A bearing as in claim 2 wherein said oil supply means further comprise annular grooves along the inner wall and communicating with said supply holes.

4. A bearing as in claim 3 wherein there are at least three of said annular grooves spaced axially along the inner wall and communicating with at least three of said supply holes.

5. A planet bearing for rotatably supporting a planet gear in an engine turbocharger drive, said bearing including an annular ring having an outer bearing surface coaxial with a cylindrical inner wall and opposite first and second ends, an oil supply groove recessed below the bearing surface and bounded axially by shoulders adjacent the ends, oil supply means through the bearing from the inner wall to the supply groove, and the improvement comprising:

passage means in at least one of said shoulders connecting said oil supply groove with an adjacent one of said ends and defining a path for expulsion of dirt-carrying oil from the bearing lubrication oil supply, and wherein said oil supply groove has a floor with a flat portion at one end adjoining an arcuate portion at an opposite end.

6. A bearing as in claim 5 wherein said oil supply means comprise supply holes opening into said supply groove near said one end.

7. A turbocharger planetary drive train having an engine driven planet carrier rotatable at a high speed, a ring gear fixed during a drive mode, a sun gear drivably connected with a turbocharger compressor and a plurality of planet gears rotatably carried by the planet carrier and engaging the sun and ring gears for driving the compressor at an elevated speed greater than that of the planet carrier, wherein the planet carrier includes axially spaced end walls extending radially outward from a rotational axis of the carrier with means in the walls receiving a plurality of removable pins in angularly spaced locations between said walls, said planet gears being rotatably supported on the pins by bearings that are fixedly mounted on the pins within and engaging internal bores of the planet gears for rotation of the planet gears on the pin carried bearings, and the improvement wherein:

the planet gears are made light by sizing their internal bores at least 50 percent larger in diameter than the diameters of their respective supporting pins, whereby the specific loading and wear on the planet gear bearings is minimized by the relatively low centrifugal forces of the light planet gears on their bearings and the high load carrying area of the bearings, wherein each said bearing includes an annular ring of bearing material having a cylindrical outer surface coaxial with a cylindrical inner wall and opposite first and second ends, the outer surface being received within and engaging the internal bore of the associated gear and the inner wall receiving the associated pin to support the bearing and gear on the carrier, an oil supply groove recessed below the outer surface and bounded axially by shoulders adjacent the ends, an oil supply hole through the bearing from the inner wall to the supply groove and passage means in at least one of said shoulders connecting said oil supply groove with an adjacent one of said ends and defining a path for expulsion of dirt-carrying oil from the bearing lubrication oil supply, wherein said passage means comprise flats formed along otherwise convex peripheries of said shoulders to effectively increase local clearance between the shoulders and an associated planet gear, wherein said oil supply groove has a floor with a flat portion at one end adjoining an arcuate portion at an opposite end, and wherein there are at least three of said annular grooves spaced axially along the inner wall and communicating with at least three of said supply holes.

* * * * *